United States Patent [19]

Mayer

[11] Patent Number: 4,475,053

[45] Date of Patent: Oct. 2, 1984

[54] BRUSH-HOLDER FOR ELECTRICAL MACHINES

[75] Inventor: Martin Mayer, Sersheim, Fed. Rep. of Germany

[73] Assignee: Robert Bosch GmbH, Stuttgart, Fed. Rep. of Germany

[21] Appl. No.: 507,696

[22] Filed: Jun. 24, 1983

[30] Foreign Application Priority Data

Jul. 10, 1982 [DE] Fed. Rep. of Germany ....... 3225939

[51] Int. Cl.³ ............................................ H02K 13/00

[52] U.S. Cl. ...................................... 310/239; 310/42; 310/241; 310/249; 29/597

[58] Field of Search ........ 310/228, 229, 230, 239–242, 310/244–247, 71, 43, 42, 249; 29/597

[56] References Cited

U.S. PATENT DOCUMENTS

| | | | |
|---|---|---|---|
| 2,753,477 | 7/1956 | Yahn | 310/244 |
| 3,159,763 | 12/1964 | Colvill | 310/245 |
| 3,493,802 | 2/1970 | Barthruff | 310/239 |
| 3,525,891 | 8/1970 | Lukawich | 310/239 |
| 3,654,504 | 4/1972 | Susdorf | 310/246 |
| 3,792,298 | 2/1974 | Hamman | 310/242 |
| 4,342,934 | 8/1982 | van Wijhe | 310/239 |

FOREIGN PATENT DOCUMENTS 2812214 9/1979 Fed. Rep. of Germany ...... 310/239

*Primary Examiner*—R. Skudy

*Attorney, Agent, or Firm*—Frishauf, Holtz, Goodman & Woodward

[57] ABSTRACT

The essentially semi-circular busbar connecting oppositely located positive brushes is shiftably held in seating means provided in the positive brush-holders and in the intermediate negative brush-holder and has an offset extension which can be firmly screwed to the lug of an exciter winding while frictional forces between the busbar and the seating means yield and allow the busbar to take a position that compensates for the accumulation of manufacturing tolerances and results in the elimination of stresses which might otherwise damage the resistance welded connections of the Litz leads of the brushes to the busbar. When the brush-holders are of metal, the seating means involve a plastic insert in a bracket against which the brush-pressure springs bear and when the brush-holders are of insulating plastic, the seating means are provided by features molded onto the brush-holder, in which case it is desirable to provide a wire clip type of spring to bear against the busbar.

7 Claims, 5 Drawing Figures

BRUSH-HOLDER FOR ELECTRICAL MACHINES

This invention concerns a brush-holder for electrical machines, such as motors and generators of the kind comprising a positioning plate on which at least two brush-holder pairs are disposed in which the corresponding brushes are held in a resilient manner, wherein a current bus connecting the positive brushes is provided to which a current connection for an exciter winding of the machine is attachable.

BACKGROUND AND PRIOR ART

In a known device, the base plate on which the brush-holders are disposed is provided with holding means for attachment of the current bus. The base plate and thereby the brush-holding device, however, is fastened to a part other than the field winding which is connected to the current bus. In this known device, therefore, there is the disadvantage that manufacturing tolerances for the brush-holder device and for the parts carrying the field winding cannot be balanced out. This results in stresses at the place of connection between the current bus and the field winding. If the field winding is soldered to the current bus, the solder joint can break. If the field winding is detachably connected to the current bus, supplementary means for compensating for the axial and radial deviations of the place of connection to the field winding and current bus are necessary.

SUMMARY OF THE INVENTION

It is an object of the present invention to avoid the dilemna of disadvantages just set forth, by providing a construction of the brush-holder and its mounting in which there is little or no accumulation of manufacturing tolerances so that a stress free connection of the field to the current bus can be made, independently of axial and radial dimensional variations of the field winding and the casing in which it is housed, as well as of the brush-holder device with respect to the current bus and to the positioning cover holding the device that closes off the casing of the electrical machine. It is a further object of the invention to obtain the object just stated with a space-saving construction in which the current bus is seated in a manner suitable for automatic assembly.

Briefly, the brushes and the brush-holder that seats the pressure springs for the brushes are provided with a seat in which the current bus is held in a manner equalizing axial, radial and circumferential tolerances relative to the longitudinal axis of the electrical machine. The invention has the advantage not only of space-saving in this disposition of the parts, but also of suitability for automatic assembly.

It is particularly desirable, when brush-holders of metal are used, to insert simply a seat of insulating synthetic plastic, axially movable on the brush-holders, which is in operating connection with the brush springs. In the case of brush-holders of insulating plastic, the seat for the current bus can be constituted directly on the brush-holders and the current bus can be held by resilient means in its seat.

BRIEF DESCRIPTION OF THE DRAWINGS

The invention is further described by way of illustrative example with reference to the annexed drawings, in which.

DESCRIPTION OF THE ILLUSTRATED EMBODIMENTS

Figure 1:
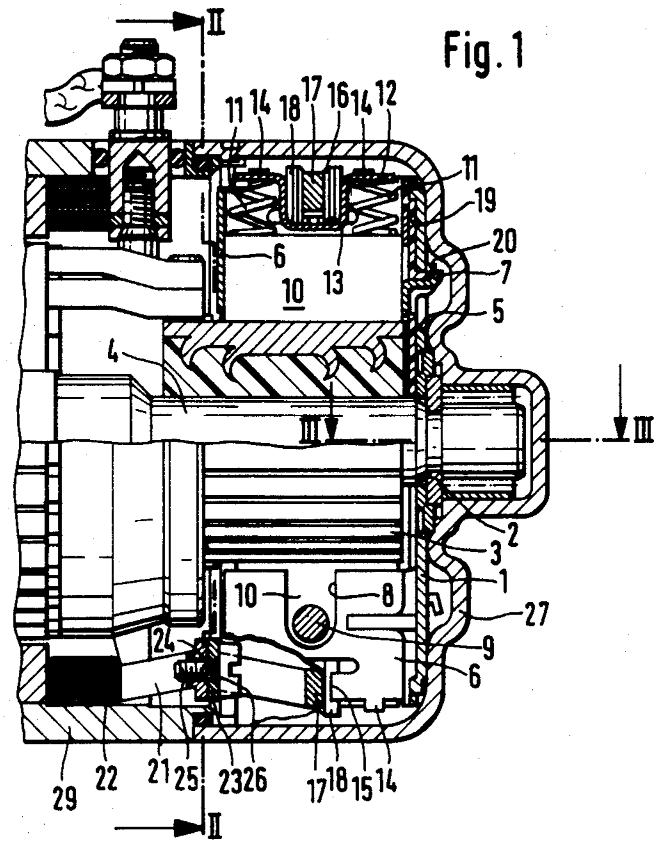
FIG. 1 is a side view, partly in section, of one end of the electrical machine containing a first embodiment of a brush-holder device according to the invention.
Figure 3:
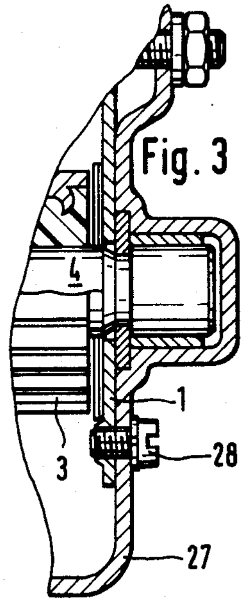
FIG. 3 shows the brush-holder of FIG. 1 in section along the line III—III of FIG. 1.
Figure 2:
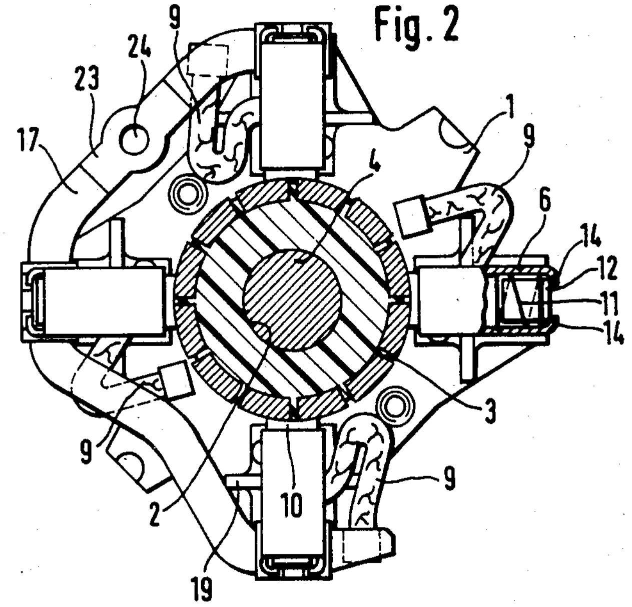
FIG. 2 shows the brush-holder device of FIG. 1 in section along the line II—II of FIG. 1.

The brush-holding device shown in FIGS. 1, 2 and 3 has a base plate 1 made of metal and provided with a central bore 2 through which there extends the drive shaft 4 of an electrical machine bearing a commutator 3. The electrical machine may be, for example, the starter motor for an internal combustion engine, and in the illustrated embodiments there are shown constructions particularly well suited for such application. For each of the brush-holders 6, there is a cut-out in the positioning plate 1.

In the first embodiment of the brush-holding device of the invention shown in FIGS. 1, 2 and 3, four metal brush-holders 6 of essentially rectangular cross-section each have at one narrow side a bent-out tab 7 which has a bent-over end approximately parallel to the narrow side. At a broad side of each brush-holder 6 a slot 8 is formed which is open towards the commutator 3 out of which a Litz wire connection 9 of a brush 10 is led out. The brush 10 is guided in the brush-holder 6 over its entire length. It lies with an end face at the commutator 3 and at its other end face there are applied respective ends of two brush-pressure springs 11, which are likewise housed in the brush-holder 6. The respective opposite ends of the brush-pressure springs 11 bear against a cover bracket 12. The strip-formed cover bracket 12 has a U-shaped depression 13 in the middle and bent out ends of the legs of the U of the depression which form the seats for the brush-pressure springs 11. The cover bracket 12 is inserted with the depression 13 extending inwards into the brush-holder 6.

At the respective broad sides of the edges of the brush-holders 6 facing the springs, two tabs 14 are provided which are bent up from the outer sides of the respective brackets 12. Each cover bracket 12 is thus held in the brush-holder 6 in an orientation radial to the longitudinal axis of the rotor of the machine. A slot 15 open to the spring-side end, is provided on both broad sides of each brush-holder 6. A seating part 16 of insulating plastic for a current bus 17 is inserted in the slots 15 and the cover depression 13 of the bracket. The seating part 16 likewise has a U-shaped cross-section. Two webs 18 are molded onto the exterior sides of its legs, these webs 18 running perpendicular to the bottom of the seating part 16 and lying internally against the broad sides of the brush-holders 6. The seating part 16 is narrower than the width of the slots 15, so that it is movable together with the bracket 12 parallel to the broad sides of the corresponding brush-holder 6.

The brush-holders 6 are each seated in an insulating part 19 of synthetic plastic. The insulating part 19 has a tab 20 molded onto its lower edge which has an end running more or less parallel to the lower edge. The brush-holder 6 is so seated on the insulating part 19 that the tabs 7 of the brush-holders 6 grip around the tabs 20 of the insulating part 19. The brush-holder 6 containing brush 10, brush-pressure springs 11 and bracket 12 is mounted together with the insulating part 19 on the base plate 1. The tabs 7 and tabs 20 then project through the corresponding cut-out 5 of the plate 1. The brush-pressure springs 11 hold the brush-holder 6 with the insulating part 19 on the base plate 1, since they push the brush-holder 6 and insulating part 19 radially away from the commutator 3 so far that the tabs 20 of the insulating part 19 lie against the outer sides of the cut-out 5 and the end of the tab 20 hooks around the edge of the cut-out 5.

The essentially semicircular current bus 17 of uninsulated conducting material is seated in three seating parts 16 which are inserted in three brush-holders 6. The current bus 17 is in each case shiftable in the seating part 16 of the middle brush-holder 6 to a limited extent in the circumferential direction and radially to the longitudinal axis of the starter motor and can swing about the seating part 16 of the middle brush-holder 6.

The ends of the current busbar 17 are inserted into the respective seating parts 16 of brusholders 6 seating oppositely located positive brushes 10. The corresponding Litz connections 9 of the positive brushes 10 are attached to the current bus 17, for example, by resistance welding. The braided Litz wires 9 of the two negative brushes 10 are fastened to the base plate 1 as a ground connection. The resulting brush-holder is preassembled automatically and forms a complete assembled unit with all the already connected brushes 10. The unit needs merely to be connected to an electrical connection 21 of the excitor winding 22 of the starter motor. The current bus 17 is provided with an offset connection portion 23 provided with a clearance hole 24 for a screw connection.

The connection lug 21 of the exciter winding extends with its end equipped with a threaded hold 25 to the connection are a 23 of the current bus 17 where the lug 21 of the exciter winding is connected and fastened to the current bus 17 to which the positive brushes 10 are connected by means of a screw 26. A bearing cap 27 put over the component unit just described against which the base plate 1 of the brush-holder device constituting the component is fastened by screws 28. The bearing cap 27 is situated at the end face of the casing 29 of the starter motor with interposition of a seal and is attached to the casing 29 in a well-known manner not further shown here.

The exciter winding 22 is attached in the casing 29 and the brush-holder device to the bearing cap 27. As the result of addition of manufacturing tolerances of the individual parts and part groups displacement of the connection lug 21 of the exciter winding 22 with respect to the connection area 23 of the current bus 17 of the brush-holding device can occur in radial, axial and circumferential direction, so that the holes 24 and 25 are not flush with each other. A fourth connection would provide stresses at the welding points of the Litz wires 9 to the bus 17 and plate 11, among others, and shear forces at the screw 26, as well as at the base plate 1,5, brush-holder 6, and insulating part 19, 20, would have the effect causing damage to the starter motor. In order to provide compensation for the tolerances, the current bus 17 in accordance with the present invention is movably seated in the seating parts 16 respectively set in three brush-holders 6. Mechanical compensation takes place in radial and circumferential direction by shifting of the current bus 17 in the plane in which it is slipped into the seating parts 16. In the case of compensation in the axial direction the seating parts 16, along with their respective brush-holder cover brackets 12 are shifted parallel to the broad sides of the brush-holders 6. The force exerted by the brush-pressure springs 11 is applied through the cover brackets 12 to the tabs 14. In consequence, with displacement of the seating parts 16 along with the cover brackets 12 friction forces arise among the cover brackets 12 and the tabs 14. These friction forces as well as the forces arising in the other direction with the displacement of the current bus 17 can be easily overcome when the connection lug 21 and the current bus 17 are screwed together. The current bus 17 then reaches a position with respect to the brush-holder device in which no stresses can be exerted any longer on the vulnerable welded electrical connections.

The friction forces exerted by the brush-pressure springs 11 in addition produce shake-proof holding of the current bus 17 in the position into which it has been screwed fast, which is particularly necessary for the mechanically rough operating conditions in motor vehicles.

Figure 4:
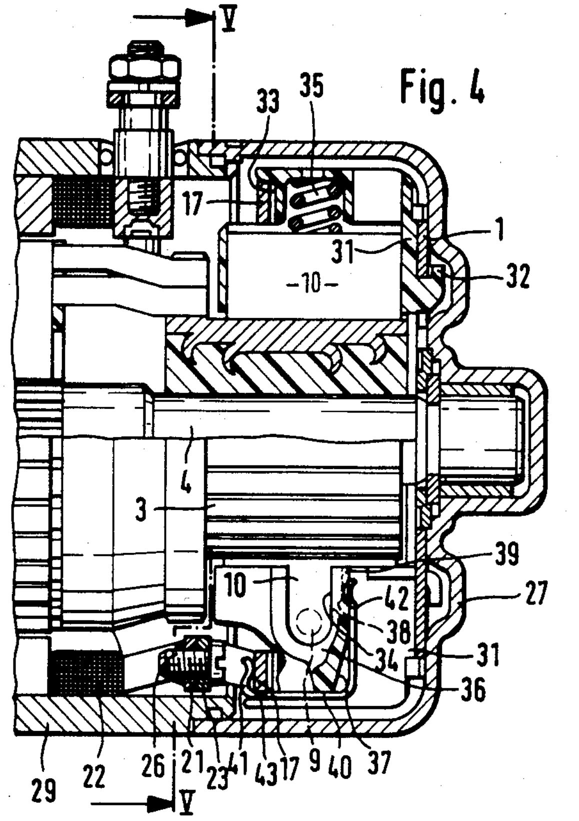
FIG. 4 is a partial side view of an electrical machine, partly in section, showing a second embodiment of brush-holder device according to the invention.
Figure 5:
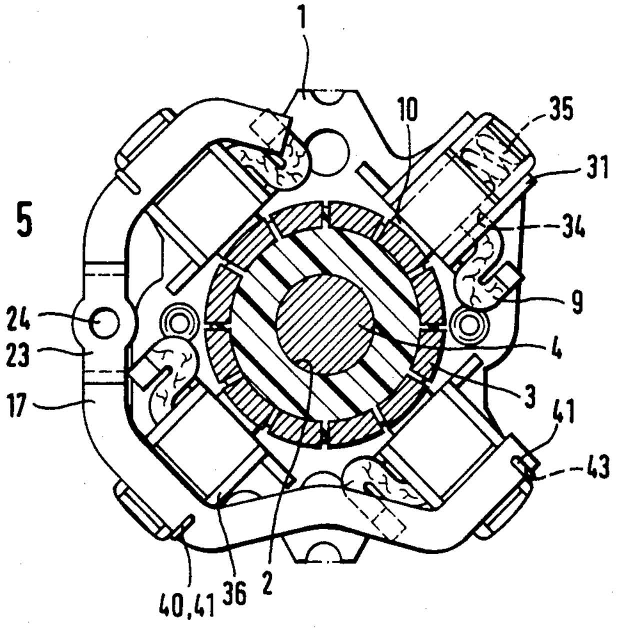
FIG. 5 is a cross-section along the line V—V of FIG. 4.

FIGS. 4 and 5 show a second embodiment of the brush-holder device in which the parts which are identical with those of the first embodiment are designated with the same reference numeral. Four brush-holders 31 are here made of insulating synthetic plastic and each provided with a hook 32 which protrudes at one narrow side of the brush-holder 31. At the other narrow side and the rear side of the brush-holder 31 a cut-out 33 is provided. It serves for seating of the current bus 17 and is somewhat wider than the current bus 17. At either broad side of the brush-holder 31 a slot 34 is formed which is open towards the commutator 3. The respective Litz connections 9 of the brushes 10 guided in the brush-holders 31 are brought out through the slots 34. The brush 10 is in each case pressed against the commutator 3 by a brush-pressure spring 35. The spring 35 bears against the bottom of the brush-holder 31. Just as in the first embodiment the spring at the same time holds the brush-holder 31 in its position on the base plate 1. A projection 36 is externally molded onto the broad side of the brush-holder 31 and is provided with a guiding slope 37 and a catch edge 38 as well as a lateral guide 39. At the broad side of the brush-holders 31 away from where the Litz connections 9 are led out, a spring 40 made of round wire is disposed. The spring 40 is approximately of U-shape, with a shorter leg 41 and a longer leg 42. Both leg ends are bent over. The shorter leg 41 hooks over the current bus laid in the cut-out 33. The longer leg 42 is pushed over the guide slope 37 of the brush-holder 31, 36 and snapped behind the catch edge 38. The leg end 42 is thereby secured behind the guide 39 against slipping off laterally from the brush-holder 31.

A groove 43 for the guiding of each of the springs 40 can be provided on the current bus 17. The shifting of the current bus 17 in the circumferential direction can thereby be limited. The shifting of the current bus 17 radially with respect to the longitudinal axis of the starter motor is made possible by the width of the seat 33 of the brush-holder 31. Substantial displacement in the axial direction is made possible against the force of the spring 40 by the guiding slope 37 of the projection 36 of the brush-holder 31, along which the longer leg 42 of the spring 40 is movable while the current bus 17 is held in the position necessary for providing the compensation of tolerance variations in the particular. The connection lug 21 is again screwed onto the current bus 17 in its connection area 23 in a manner favorable for assembly.

Although the invention has been disclosed with reference to two particular illustrative embodiments, it will be understood that further modifications and variations are possible within the inventive concept.

I claim:

1. Brush-holder device for an electrical machine having a base plate on which at least two brush-holder pairs are mounted in which brushes are respectively disposed under spring pressure and having also a current busbar connecting the positive brushes which is connectable to a connection lug of an exciter winding, said device further having the improvement comprising:
   seating means (16;33), provided on at least three of said brush-holders (6;31), which brush holders contain brushes (10) and brush-pressure springs (11;35), for holding said current busbar (17) so that said busbar is movable in said seating means in axial, radial and circumferential directions to an extent sufficient for compensating dimensional variations of parts within manufacturing tolerances, said movability of said busbar in said seating means being axial, radial and circumferential with respect to the longitudinal axis of the electrical machine.

2. Brush-holder device according to claim 1 in which said brush-holders (6) are of metal and in which said seating means (16) are constituted by a molded piece of insulating synthetic plastic which is seated in a cavity (15) provided in each of said at least three brush-holders (6).

3. Brush-holder device according to claim 2, wherein said seating means (16) are seated in a cover bracket (12) in each of said at least three brush-holders (6) against which cover brackets (12) the said brush-pressure springs (11) in said respective brush-holders bear.

4. Brush-holder device according to claim 2, in which said seating means (16) grip a section of said busbar (17), in the neighborhood of a plurality of said brush-holders (6), by going around said busbar (17) in U-shaped configuration, the exterior side of the legs of the U configuration being provided with webs (18) which are guided along the brush-holder (6).

5. Brush-holder device according to claim 1 in which said brush-holders (31) are of insulating synthetic plastic and in which said seating means (33) for said busbar (17) are molded onto said brush-holders (31).

6. Brush-holder device according to claim 5, wherein spring means (40) are provided for holding said busbar (17) in said seating means (33).

7. Brush-holder device according to claim 6, wherein said spring means are guided in said brush-holder (31) in a manner permitting resilient flexing of said spring means (35).

* * * * *